US008349380B2

(12) United States Patent
Sauer et al.

(10) Patent No.: US 8,349,380 B2
(45) Date of Patent: Jan. 8, 2013

(54) BROMINE-BASED BIOCIDES SUITABLE FOR FOOD PROCESSING

(75) Inventors: Joe D. Sauer, Baton Rouge, LA (US); George W. Cook, Jr., Baton Rouge, LA (US); William S. Pickrell, Tokyo (JP)

(73) Assignee: Albemarle Corporation, Baton Rouge, LA (US)

( * ) Notice: Subject to any disclaimer, the term of this patent is extended or adjusted under 35 U.S.C. 154(b) by 464 days.

(21) Appl. No.: 12/520,443

(22) PCT Filed: Jan. 11, 2008

(86) PCT No.: PCT/US2008/050898
§ 371 (c)(1),
(2), (4) Date: Apr. 5, 2010

(87) PCT Pub. No.: WO2008/089086
PCT Pub. Date: Jul. 24, 2008

(65) Prior Publication Data
US 2010/0196566 A1 Aug. 5, 2010

Related U.S. Application Data

(60) Provisional application No. 60/884,636, filed on Jan. 12, 2007, provisional application No. 60/884,639, filed on Jan. 12, 2007.

(51) Int. Cl.
*A23L 1/304* (2006.01)
(52) U.S. Cl. .......... 426/74; 426/321; 426/326; 426/331; 426/335
(58) Field of Classification Search .................. 426/331, 426/321, 326, 335, 74
See application file for complete search history.

(56) References Cited

U.S. PATENT DOCUMENTS

| | | | |
|---|---|---|---|
| 2,766,124 A | 10/1956 | Upham et al. | |
| 3,044,884 A | 7/1962 | Rader et al. | |
| 3,147,529 A | 9/1964 | Paterson | |
| 4,081,474 A | 3/1978 | Baker et al. | |
| 4,382,799 A | 5/1983 | Davis et al. | |
| 4,681,948 A | 7/1987 | Worley | |
| 4,740,524 A | 4/1988 | Hsu | |
| 4,767,542 A | 8/1988 | Worley | |
| 4,822,816 A | 4/1989 | Markham | |
| 4,968,716 A | 11/1990 | Markham | |
| 4,978,685 A | 12/1990 | Gannon et al. | |
| 5,057,612 A | 10/1991 | Worley et al. | |
| 5,070,085 A | 12/1991 | Markham | |
| 5,679,239 A | 10/1997 | Blum et al. | |
| 5,948,315 A | 9/1999 | Yang et al. | |
| 6,007,726 A | 12/1999 | Yang et al. | |
| 6,068,861 A | 5/2000 | Moore, Jr. et al. | |
| 6,156,229 A | 12/2000 | Yang et al. | |
| 6,270,722 B1 | 8/2001 | Yang et al. | |
| 6,508,954 B1 | 1/2003 | Einagar et al. | |
| 6,809,205 B1 | 10/2004 | Elnagar et al. | |
| 6,908,636 B2 | 6/2005 | Howarth | |
| 6,986,910 B2 | 1/2006 | Howarth | |
| 6,998,369 B2 | 2/2006 | Hei et al. | |
| 7,008,545 B2 | 3/2006 | Cronan, Jr. et al. | |
| 7,108,879 B2 | 9/2006 | Schur | |
| 7,498,051 B2 * | 3/2009 | Man et al. | 426/332 |
| 2004/0013561 A1 * | 1/2004 | Mann et al. | 422/22 |
| 2004/0022874 A1 | 2/2004 | Nalepa et al. | |
| 2005/0096245 A1 | 5/2005 | Hei et al. | |
| 2005/0151117 A1 | 7/2005 | Man et al. | |
| 2005/0152991 A1 | 7/2005 | Man et al. | |
| 2005/0153031 A1 | 7/2005 | Man et al. | |
| 2010/0196566 A1 | 8/2010 | Sauer et al. | |

FOREIGN PATENT DOCUMENTS

| | | |
|---|---|---|
| EP | 1113112 A1 | 4/2001 |
| GB | 1012629 | 12/1965 |
| WO | 02060280 A2 | 8/2002 |
| WO | 03001931 A1 | 1/2003 |
| WO | 03073849 A1 | 9/2003 |
| WO | 2005067741 A1 | 7/2005 |
| WO | 2005068378 A1 | 7/2005 |
| WO | 2006043948 A1 | 4/2006 |

OTHER PUBLICATIONS

Burgess W. et al. Derwent 2012 "Sterilizing a biological material", US 20040013461, abandoned. , p. 1.*
Mountney, et al.; Poultry Products Technology; Third Edition; 1995; p. 68; Table 4.1; (Comparison of Composition of Cooked Meats).
Author Unknown; "Fish (food)" Wikipedia article; Website: http://en.wilipedia.org/wiki/Fish_(food); (Visited May 16, 2012); 2 pages.
Braconnier, Deborah; Does Fish Have More Protein Than Beef?; Website: http//www.livestrong.com/article/533162-does-fish-have-more-protein-than-beef/; Sep. 1, 2011; (Visited May 16, 2012); 2 pages.
Nygaard, Nadia; "Is Fish or Chicken a Better Protein?"; Website: http://www.livestrong.com/article/524369-is-fish-or-chicken-a-better-protein/; Aug. 23, 2011; (Visited May 16, 2012); 2 pages.
Author Unknown; "Choosing Healthy Fats"; Website: http://www.helpguide.org/life/healthy_diet_fats.htm; (Visited May 16, 2012); 2 pages.

* cited by examiner

*Primary Examiner* — Helen F Heggestad
(74) *Attorney, Agent, or Firm* — Marcy M. Hoefling

(57) ABSTRACT

Ultraviolet light stabilized antimicrobial compositions are formed from (A) and (B). (A) is (I) a solid-state microbiocidal compound having at least one bromine atom in the molecule; (II) an aqueous solution or slurry of (I); (III) is a concentrated aqueous antimicrobial composition having a dissolved active bromine content derived from (i) BrCl or BrCl and Br2 and (ii) overbased alkali metal sulfamate and/or sulfamic acid, alkali metal base, and water, (IV) solids made by dewatering a composition of (III). (B) is a ultraviolet light degradation-inhibiting amount of up to one part by weight of ascorbic acid, dehydroascorbic acid and/or an edible water-soluble salt/ester thereof per part by weight of bromine in the selected antimicrobial composition. Preparation and uses of such compositions are described. Methods of controlling contamination of seafood and seafood products by pathogens are also described.

8 Claims, No Drawings

US 8,349,380 B2

BROMINE-BASED BIOCIDES SUITABLE FOR FOOD PROCESSING

REFERENCE TO RELATED APPLICATIONS

This application is the National Stage of International Patent Application PCT/US2008/050898, filed on Jan. 11, 2008, which application claims priority from U.S. Application Nos. 60/884,636, filed Jan. 12, 2007, and 60/884,639, filed Jan. 12, 2007, the disclosures of which are incorporated herein by reference.

TECHNICAL FIELD

This invention relates, inter alia, to new antimicrobial compositions having improved properties, to aqueous media with which have been blended such new antimicrobial compositions and to methods for controlling microbes utilizing such antimicrobial compositions and methods for stabilizing such antimicrobial compositions against ultraviolet light-induced degradation. Also, this invention relates to use of effective antimicrobial solutions for controlling contamination of seafood and seafood products by various pathogens such as species of *Listeria, Escherichia, Salmonella, Campylobacter*, and others. As used herein, the term "seafood" denotes fish harvested from fresh water, brackish water, or salt water, and thus includes fish, shellfish, crustaceans, etc. that are harvested or caught from oceans, seas, bays, lakes, rivers, streams, ponds, marshy areas, and the like.

BRIEF SUMMARY OF THE INVENTION

A first aspect includes embodiments in which stabilization of antimicrobials against ultraviolet light degradation is involved. A second aspect involves embodiments in which a new way of controlling bacterial, yeast, and/or mold contamination of seafood and seafood products at any of a variety of points in the manufacture, distribution, or dispensing of seafood and seafood products.

First Aspect

In accordance with one embodiment of this invention new antimicrobial compositions having improved properties are provided. Pursuant to this embodiment, there is provided an antimicrobial composition stabilized against ultraviolet light degradation formed from components comprising:

(A) at least one microbiocidal component selected from the group consisting of:
I) at least one solid-state microbiocidal compound having at least one bromine atom in the molecule;
II) an aqueous solution or slurry of at least one solid-state microbiocidal compound having at least one bromine atom in the molecule;
III) a concentrated aqueous microbiocidal composition having an active bromine content of at least 50,000 ppm, which composition is formed from components comprising water and (i) bromine chloride or bromine chloride and bromine, with or without conjoint use of chlorine, and (ii) overbased alkali metal salt of sulfamic acid, and/or sulfamic acid, alkali metal base, and water, wherein the relative proportions of (i) and (ii) are such that the atom ratio of nitrogen to active bromine is greater than 0.93, and wherein the pH of the composition is greater than 7;
IV) a solid-state microbiocidal composition which is a dewatered concentrated aqueous antimicrobial composition of III); and
(B) at least one ultraviolet light-stabilizer selected from (i) ascorbic acid, (ii) dehydroascorbic acid, (iii) an edible water-soluble salt or ester of ascorbic acid, (iv) an edible water-soluble salt or ester of dehydroascorbic acid, or (v) a mixture of any two or more of (i) through (iv).

Another embodiment of this invention provides an aqueous medium with which has been blended a microbiocidal quantity of an antimicrobial composition as described herein.

Another embodiment of this invention is a method of controlling microbial contamination of carcasses of poultry or four-legged animals in the processing of poultry or four-legged animals as food products, which method comprises contacting said carcasses with an aqueous medium containing an effective microbial inhibiting amount of active bromine resulting from the addition to said medium of an antimicrobial composition stabilized against ultraviolet light degradation formed from components comprising:

(A) at least one microbiocidal component selected from the group consisting of:
I) at least one solid-state microbiocidal compound having at least one bromine atom in the molecule;
II) an aqueous solution or slurry of at least one solid-state microbiocidal compound having at least one bromine atom in the molecule;
III) a concentrated aqueous microbiocidal composition having an active bromine content of at least 50,000 ppm, which composition is formed from components comprising water and (i) bromine chloride or bromine chloride and bromine, with or without conjoint use of chlorine, and (ii) overbased alkali metal salt of sulfamic acid, and/or sulfamic acid, alkali metal base, and water, wherein the relative proportions of (i) and (ii) are such that the atom ratio of nitrogen to active bromine is greater than 0.93, and wherein the pH of the composition is greater than 7;
IV) a solid-state microbiocidal composition which is a dewatered concentrated aqueous antimicrobial composition of III); and
(B) at least one ultraviolet light-stabilizer selected from (i) ascorbic acid, (ii) dehydroascorbic acid, (iii) an edible water-soluble salt or ester of ascorbic acid, (iv) an edible water-soluble salt or ester of dehydroascorbic acid, or (v) a mixture of any two or more of (i) through (iv);

said contacting inhibiting contamination of said carcasses by microorganisms. A preferred embodiment of such processing of poultry or four-legged animals involves utilizing as component (A) an antimicrobial composition of I) or II), or both. More preferably I) is used and is at least one 1,3-dibromo-5,5-dialkylhydantoin in which one of the alkyl groups is a methyl group and the other alkyl group contains in the range of 1 to about 4 carbon atoms and/or II) is used and is a solution of at least one 1,3-dibromo-5,5-dialkylhydantoin of I). Still more preferably, I) is used and is 1,3-dibromo-5,5-dimethylhydantoin and/or II) is used and is a solution of 1,3-dibromo-5,5-dimethylhydantoin.

Still another embodiment of this invention comprises methods of controlling microbes, which methods comprise applying to the locus of the microbes an antimicrobial quantity of an aqueous medium containing active bromine formed by mixing with said aqueous medium, an antimicrobial composition of this invention.

A further embodiment of this invention are methods of stabilizing an antimicrobial composition of I), II), III), or IV) against ultraviolet light degradation.

Second Aspect

Pursuant to one embodiment, there is provided a method of controlling bacterial, yeast, and/or mold contamination of seafood or seafood products, which method comprises applying to the seafood or seafood product an aqueous microbiocidal composition formed from components comprising water and at least one microbiocidal component that is selected from at least one of the following groups:

I) at least one solid-state microbiocidal compound having at least one bromine atom in the molecule;

II) an aqueous solution or slurry of at least one solid-state microbiocidal compound having at least one bromine atom in the molecule;

III) a concentrated aqueous microbiocidal composition having an active bromine content of at least 50,000 ppm, which composition is formed from components comprising water and (i) bromine chloride or bromine chloride and bromine, with or without conjoint use of chlorine and (ii) overbased alkali metal salt of sulfamic acid and/or sulfamic acid, alkali metal base, and water, wherein the relative proportions of (i) and (ii) are such that the atom ratio of nitrogen to active bromine is greater than 0.93, and wherein the pH of the composition is greater than 7;

IV) a solid-state microbiocidal composition which is a dewatered concentrated aqueous antimicrobial composition of III).

In a preferred embodiment, the aqueous microbiocidal composition applied to the seafood or seafood product is stabilized against ultraviolet light-induced degradation. Accordingly, this embodiment is a method of controlling bacterial, yeast, and/or mold contamination of seafood or seafood products, which method comprises applying to the seafood or seafood product an aqueous microbiocidal composition stabilized against ultraviolet light-induced degradation formed from components comprising water and:

A) at least one microbiocidal component that is selected from at least one of the following groups:

I) at least one solid-state microbiocidal compound having at least one bromine atom in the molecule;

II) an aqueous solution or slurry of at least one solid-state microbiocidal compound having at least one bromine atom in the molecule;

III) a concentrated aqueous microbiocidal composition having an active bromine content of at least 50,000 ppm, which composition is formed from components comprising water and (i) bromine chloride or bromine chloride and bromine, with or without conjoint use of chlorine and (ii) overbased alkali metal salt of sulfamic acid and/or sulfamic acid, alkali metal base, and water, wherein the relative proportions of (i) and (ii) are such that the atom ratio of nitrogen to active bromine is greater than 0.93, and wherein the pH of the composition is greater than 7;

IV) a solid-state microbiocidal composition which is a dewatered concentrated aqueous antimicrobial composition of III); and B) at least one ultraviolet light stabilizer selected from (i) ascorbic acid, (ii) dehydroascorbic acid, (iii) an edible water-soluble salt or ester of ascorbic acid, (iv) an edible water-soluble salt or ester of dehydroascorbic acid, or (v) a mixture of any two or more of (i) through (iv).

To form the microbiocidal compositions used in this embodiment, the selected components of A) and B) can be mixed with the water either separately or as a preformed mixture.

In particularly preferred embodiments, the applied aqueous microbiocidal composition (whether or not a selected component of B) is used) is allowed to remain in contact with the seafood or seafood product for a microbiocidally-effective period, which typically is in the range of about 10 seconds to about 30 minutes, and preferably in the range of about 30 seconds to about 5 minutes, and then the seafood or seafood product is thoroughly washed at least once with water which, optionally, contains at least one surfactant. In this connection and as a general rule, the higher the concentration of bromine in the aqueous microbiocidal composition used, the shorter should be the time the aqueous microbiocidal composition is allowed to be in contact with the seafood or seafood product. The one or more washes that are utilized should be thorough enough to at least remove any and all detectable quantities of the antimicrobial composition from the treated seafood or seafood product. If a surfactant is used in one or more such washes, one or more subsequent water washes are to be employed to ensure removal of the surfactant from the seafood or seafood product.

These and other embodiments and features of this invention will be still further apparent from the ensuing description and the appended claims.

FURTHER DETAILED DESCRIPTION OF EMBODIMENTS OF THE FIRST AND SECOND ASPECTS

For convenience the bromine-based microbiocides used in the practice of this invention are sometimes collectively referred to hereinafter as component (A). Component (A) is comprised of four groups designated Groups I), II), III), and IV), which are more fully described below.

Group I) of Bromine-Based Microbiocides

Among solid-state microbiocidal compounds utilized in the practice of this invention are those having at least one bromine atom in the molecule. Such compounds are exemplified by (a) 1,3-dihalo-5,5-dialkylhydantoins in which both of the halo atoms are bromine atoms and one of the alkyl groups is a methyl group and the other is a $C_{1-4}$ alkyl group and by (b) 1,3-dihalo-5,5-dialkylhydantoins in which one of the halo atoms is a bromine atom and the other is a chlorine atom, and both alkyl groups are, independently, $C_{1-4}$ alkyl groups. Because of their effectiveness and availability as articles of commerce, these solid-state microbiocidal compounds of (a) and (b) are more preferred than any other type of solid-state microbiocidal compound, and because of superior effectiveness, those of (b) are even more preferred, with 1,3-dibromo-5,5-dimethylhydantoin being most preferred of all.

Non-limiting examples of compounds of type (a) include 1,3-dibromo-5,5-dimethylhydantoin, 1,3-dibromo-5-ethyl-5-methylhydantoin, 1,3-dibromo-5-n-propyl-5-methylhydantoin, 1,3-dibromo-5-isopropyl-5-methylhydantoin, 1,3-dibromo-5-n-butyl-5-methylhydantoin, 1,3-dibromo-5-isobutyl-5-methylhydantoin, 1,3-dibromo-5-sec-butyl-5-methylhydantoin, 1,3-dibromo-5-tert-butyl-5-methylhydantoin, and mixtures of any two or more of them. Of these biocidal agents, 1,3-dibromo-5-isobutyl-5-methylhydantoin, 1,3-dibromo-5-n-propyl-5-methylhydantoin, and 1,3-dibromo-5-ethyl-5-methylhydantoin are, respectively, preferred, more preferred, and even more preferred members of this group from the cost effectiveness standpoint. Of the mixtures of the foregoing biocides that can be used pursuant to this invention, it is preferred to use 1,3-dibromo-5,5-dimethylhydantoin as one of the components, with a mixture of 1,3-dibromo-5,5-dimethylhydantoin and 1,3-dibromo-5-ethyl-5-methylhydantoin being particularly preferred. The most preferred member of this group of microbiocides is 1,3-dibromo-5,5-dimethylhydantoin. This compound is available in the marketplace in tablet or granular form under the trade designations XtraBrom® 111 biocide and Xtra- Brom® 111T biocide (Albemarle Corporation). When a mixture of two or more of the foregoing 1,3-dibromo-5,5-dialkylhydantoin biocides is used pursuant to this invention, the individual biocides of the mixture can be in any proportions relative to each other.

Non-limiting examples of compounds of type (b) include N,N'-bromochloro-5,5-dimethylhydantoin, N,N'-bromochloro-5-ethyl-5-methylhydantoin, N,N'-bromochloro-5-propyl-5-methylhydantoin, N,N'-bromochloro-5-isopropyl-5-methylhydantoin, N,N'-bromochloro-5-butyl-5-methylhydantoin, N,N'-bromochloro-5-isobutyl-5-methylhydantoin, N,N'-bromochloro-5-sec-butyl-5-methylhydantoin, N,N'-bromochloro-5-tert-butyl-5-methylhydantoin, N,N'-bromochloro-5,5-diethylhydantoin, and mixtures of any two or more of the foregoing. N,N'-bromochloro-5,5-dimethylhydantoin is available commercially under the trade designation Bromicide® biocide (Great Lakes Chemical Corporation). Another suitable bromochlorohydantoin mixture is composed predominantly of N,N'-bromochloro-5,5-dimethylhydantoin together with a minor proportion by weight of 1,3-dichloro-5-ethyl-5-methylhydantoin. A mixture of this latter type is available in the marketplace under the trade designation Dantobrom® biocide (Lonza Corporation). Of such products, N,N'-bromochloro-5,5-dimethylhydantoin is a preferred material because of its commercial availability and its suitability for use in the practice of this invention. The designation N,N' in reference to, say, N,N'-bromochloro-5,5-dimethylhydantoin means that this compound can be (1) 1-bromo-3-chloro-5,5-dimethylhydantoin, or (2) 1-chloro-3-bromo-5,5-dimethylhydantoin, or (3) a mixture of 1-bromo-3-chloro-5,5-dimethylhydantoin and 1-chloro-3-bromo-5,5-dimethylhydantoin. Also, it is conceivable that some 1,3-dichloro-5,5-dimethylhydantoin and 1,3-dibromo-5,5-dimethylhydantoin could be present in admixture with (1), (2), or (3).

Methods for preparing compounds of types (a) and (b) above are known and are reported in the literature. See for example U.S. Pat. Nos. 3,147,259; 6,508,954; and 6,809,205.

Other known solid-state microbiocidal compounds which may be utilized include N,N'-dihalo-2-imidazolidinones, such as 1,3-dibromo-4,4,5,5-tetramethyl-2-imidazolidinone, 1-bromo-3-chloro-4,4,5,5-tetramethyl-2-imidazolidinone, 1-chloro-3-bromo-4,4,5,5-tetramethyl-2-imidazolidinone, 1,3-dibromo-2,2,5,5-tetramethylimidazolidin-4-one, 1-bromo-3-chloro-2,2,5,5-tetramethylimidazolidin-4-one, 1-chloro-3-bromo-2,2,5,5-tetramethylimidazolidin-4-one. Preparation of such compounds is described in U.S. Pat. Nos. 4,681,948; 4,767,542; and 5,057,612.

Still other known solid-state microbiocidal compounds which may be utilized are sulfonyloxy bromoacetanilides such as m-isobutyl-sulfonyloxy bromoacetanilide and m-phenyl-sulfonyloxy bromoacetanilide. Still other examples and the preparation of such compounds are given in U.S. Pat. No. 4,081,474.

Another type of known solid-state microbiocidal compounds which may be utilized are bromine-containing alpha-halo pyruvate oximes such as described in U.S. Pat. No. 4,740,524. Examples of such compounds include ethyl 3-bromo-2-(4-chlorobenzoyloximino)propanoate, ethyl 3-bromo-2-(N'-methylcarbomoyloximino)propanoate, and ethyl 3-bromo-2-(4-methylbenzoyloximino)prop anoate.

Yet another type of solid-state bromine-containing microbiocidal compounds which can be used are non-polymeric quaternary ammonium polybromides described in U.S. Pat. No. 4,978,685. Examples of such compounds include N-ethyl-N, N, N-trimethylammonium tribromide; N-ethyl-N-methylmorpholinium tribromide; N-benzyl-N,N-dimethyl-N-myristylammonium dibromochloride; N, N, N, N-tetrabutylammonium tribromide; and N, N, N, N-tetrabutylammonium dibromochloride.

Still other solid-state bromine-containing microbiocidal compounds are known and reported in the literature.

Group II) of Bromine-Based Microbiocides

Group II) constitutes another group of bromine-based microbiocides that can be utilized in the practice of this invention. These are aqueous solutions or slurries of a solid-state microbiocidal compound having at least one bromine atom in the molecule. Compounds referred to above in connection with Group I) can be used. The solutions can contain any concentration of the respective compounds up to their saturation points. If higher concentrations are desired, slurries containing quantities in excess of the respective saturation points can be formed and used. Thus, for some non-limiting examples of Group II) compounds, see the examples given above in connection with Group I).

Group III) of Bromine-Based Microbiocides

A number of bromine-based microbiocides are typically formed and provided in the form of concentrated aqueous solutions, and these concentrated aqueous solutions constitute Group III) of the bromine-based microbiocides which can be stabilized against ultraviolet light radiation and used pursuant to this invention. Such microbiocides are typically stabilized against chemical decomposition and physical evaporation of active bromine species by the inclusion in the product during its formation of a suitable stabilizing component for the active bromine in the concentrated solution. A preferred liquid state bromine-based biocide of this type is an aqueous biocide composition comprising water having in solution therein an active bromine content derived from (i) bromine chloride or bromine chloride and bromine, with or without conjoint use of chlorine, of at least 50,000 ppm (wt/wt) and preferably at least 100,000 ppm (wt/wt), and (ii) overbased alkali metal salt of sulfamic acid and/or sulfamic acid, alkali metal base, and water, wherein the relative proportions of (i) and (ii) are such that the atom ratio of nitrogen to active bromine is greater than 0.93, and wherein the pH of the composition is greater than 7. Concentrated solutions of this type are available in the marketplace, for example, Stabrom® 909 biocide (Albemarle Corporation). One suitable process for producing these concentrated aqueous microbiocidal solutions is described in commonly-owned U.S. Pat. No. 6,068,861, issued May 30, 2000, all disclosure of which is incorporated herein by reference. Another commercial concentrated aqueous microbiocidal solution that can be utilized in practicing this invention is available under the trade designation Stabrex™ biocide (Nalco Chemical Company). This product also contains active bromine stabilized against chemical decomposition and physical evaporation of active bromine species by the inclusion with sulfamate. For additional details concerning preparation of aqueous microbiocidal solutions stabilized with sulfamic acid, see U.S. Pat. Nos. 6,007,726; 6,156,229; and 6,270,722.

Group IV) of Bromine-Based Microbiocides

This group of bromine-based microbiocides is composed of solid-state microbiocidal compositions formed by dewatering (i.e., removing at least all of the liquid water from) sulfamate-stabilized aqueous concentrates of active bromine of Group III) above. A preferred solid-state microbiocidal composition of this type is formed by dewatering an aqueous biocide composition comprising water having in solution therein an active bromine content derived from (i) bromine chloride or bromine chloride and bromine, with or without conjoint use of chlorine, of at least 50,000 ppm (wt/wt) and preferably at least 100,000 ppm (wt/wt), and (ii) overbased alkali metal salt of sulfamic acid and/or sulfamic acid, alkali metal base, and water, wherein the relative proportions of (i) and (ii) are such that the atom ratio of nitrogen to active bromine is greater than 0.93, and wherein the pH of the composition is greater than 7. As noted above, concentrated solutions of this type are available in the marketplace, for example, Stabrom® 909 biocide (Albemarle Corporation). Removal of water can be accomplished by flashing or distillation at reduced pressure or preferably by spray drying. Such solid state products are typically in the form of powders or small particles, but can be compacted into larger forms preferably with the aid of one or more suitable binding agents. Further details concerning such processing are described in U.S. published Patent Application No. 2004/0022874 A1, all disclosure of which relating to formation of such solid-state compositions is incorporated herein by reference. In that application are disclosed, inter alia, the following composition and process:

"A concentrated liquid biocide composition which comprises an aqueous solution of active bromine formed from (a) bromine, bromine chloride or a mixture of bromine chloride and bromine with (b) alkali metal salt of sulfamic acid and/or sulfamic acid, alkali metal base and water, or an aqueous solution of alkali metal salt of sulfamic acid formed from (1) alkali metal salt of sulfamic acid and/or sulfamic acid, (2) alkali metal base and (3) water, such aqueous solution of active bromine having a pH of at least about 7, and wherein the amounts of (a) and (b) are such that (i) the content of active bromine in the aqueous solution of active bromine is above about 160,000 ppm (wt/wt) (ii) the atom ratio of nitrogen to active bromine from (a) and (b) is greater than 1 when bromine is used without bromine chloride, and greater than 0.93 when bromine chloride is used with or without bromine.

"A process of forming a solid state bromine-containing biocidal composition, which process comprises removing the water from an aqueous solution or slurry of a product formed in water from (A) (i) bromine, (ii) bromine chloride, (iii) a mixture of bromine chloride and bromine, (iv) bromine and chlorine in a $Br_2$ to $Cl_2$ molar ratio of at least about 1, or (v) bromine chloride, bromine, and chlorine in proportions such that the total $Br_2$ to $Cl_2$ molar ratio is at least about 1; and (B) (i) alkali metal salt of sulfamic acid and/or sulfamic acid, and (ii) alkali metal base, wherein such aqueous solution or slurry has a pH of at least 7 and an atom ratio of nitrogen to active bromine from (A) and (B) of greater than 0.93."

Analytical Procedures

In order to measure the quantity of active bromine or active halogen in a water system being treated with an antimicrobial composition of this invention, standard well known analytical procedures can be used. The term "active bromine" of course refers to all bromine-containing species that are capable of biocidal activity. It is generally accepted in the art that all of the bromine in the +1 oxidation state is biocidally active and is thus included in the term "active bromine" As is well known in the art, bromine, bromine chloride, hypobromous acid, hypobromite ion, hydrogen tribromide, tribromide ion, and organo-N-brominated compounds have bromine in the +1 oxidation state. Thus these, as well as other such species to the extent they are present, constitute the active bromine content of the compositions of this invention. See, for example, U.S. Pat. No. 4,382,799 and U.S. Pat. No. 5,679,239. A well-established method in the art for determining the amount of active bromine in a solution is starch-iodine titration, which determines all of the active bromine in a sample, regardless of what species may constitute the active bromine. The usefulness and accuracy of the classical starch-iodine method for quantitative determination of bromine and many other oxidizing agents has long been known, as witness Chapter XIV of Willard-Furman, *Elementary Quantitative Analysis*, Third Edition, D. Van Nostrand Company, Inc., New York, Copyright 1933, 1935, 1940.

A typical starch-iodine titration to determine active bromine is carried out as follows: A magnetic stirrer and 50 milliliters of glacial acetic acid are placed in an iodine flask. The sample (usually about 0.2-0.5 g) for which the active bromine is to be determined is weighed and added to the flask containing the acetic acid. Water (50 milliliters) and aqueous potassium iodide (15% (wt/wt); 25 milliliters) are then added to the flask. The flask is stoppered using a water seal. The solution is then stirred for fifteen minutes, after which the flask is unstoppered and the stopper and seal area are rinsed into the flask with water. An automatic buret (Metrohm Limited) is filled with 0.1 normal sodium thiosulfate. The solution in the iodine flask is titrated with the 0.1 normal sodium thiosulfate; when a faint yellow color is observed, one milliliter of a 1 wt % starch solution in water is added, changing the color of the solution in the flask from faint yellow to blue. Titration with sodium thiosulfate continues until the blue color disappears. The amount of active bromine is calculated using the weight of the sample and the volume of sodium thiosulfate solution titrated. Thus, the amount of active bromine in a composition of this invention, regardless of actual chemical form, can be determined by use of this method.

Another standard method for determining active bromine is commonly known as the DPD test procedure. This method is well suited for determining very small amounts of active bromine in aqueous systems. The standard DPD test for determination of low levels of active halogen is based on classical test procedures devised by Palin in 1974. See A. T. Palin, "Analytical Control of Water Disinfection With Special Reference to Differential DPD Methods For Chlorine, Chlorine Dioxide, Bromine, Iodine and Ozone", *J. Inst. Water Eng.*, 1974, 28, 139. While there are various modernized versions of the Palin procedures, the recommended version of the test is fully described in *Hach Water Analysis Handbook,* 3rd edition, copyright 1997. The procedure for "total chlorine" (i.e., active chlorine) is identified in that publication as Method 8167 appearing on page 379, Briefly, the "total chlorine" test involves introducing to the dilute water sample containing active halogen, a powder comprising DPD indicator powder, (i.e., N,N'-diethyldiphenylenediamine), KI, and a buffer. The active halogen species present react(s) with KI to yield iodine species which turn the DPD indicator to red/pink. The intensity of the coloration depends upon the concentration of "total chlorine" species (i.e., active chlorine") present in the sample. This intensity is measured by a colorimeter calibrated to transform the intensity reading into a "total chlorine" value in terms of mg/L $Cl_2$. If the active halogen present is active bromine, the result in terms of mg/L $Cl_2$ is multiplied by 2.25 to express the result in terms of mg/L $Br_2$ of active bromine In greater detail, the DPD test procedure is as follows:
1. To determine the amount of species present in the water which respond to the "total chlorine" test, the water sample should be analyzed within a few minutes of being taken, and preferably immediately upon being taken.
2. Hach Method 8167 for testing the amount of species present in the water sample which respond to the "total chlorine" test involves use of the Hach Model DR 2010 colorimeter. The stored program number for chlorine determinations is recalled by keying in "80" on the keyboard, followed by setting the absorbance wavelength to 530 nm by rotating the dial on the side of the instrument. Two identical sample cells are filled to the 10 mL mark with the water under investigation. One of the cells is arbitrarily chosen to be the blank. To the second cell, the contents of a DPD Total Chlorine Powder Pillow are added. This is shaken for 10-20 seconds to mix, as the development of a pink-red color indicates the presence of species in the water which respond positively to the DPD "total chlorine" test reagent. On the keypad, the SHIFT TIMER keys are depressed to commence a three minute reaction time. After three minutes the instrument beeps to signal the reaction is complete. Using the 10 mL cell riser, the blank sample cell is admitted to the sample compartment of the Hach Model DR 2010, and the shield is closed to prevent stray light effects. Then the ZERO key is depressed. After a few seconds, the display registers 0.00 mg/L $Cl_2$. Then, the blank sample cell used to zero the instrument is removed from the cell compartment of the Hach Model DR 2010 and replaced with the test sample to which the DPD "total chlorine" test reagent was added. The light shield is then closed as was done for the blank, and the READ key is depressed. The result, in mg/L $Cl_2$ is shown on the display within a few seconds. This is the "total chlorine" level of the water sample under investigation. By multiplying this value by 2.25, the level of active bromine in the water sample is provided.

Further Detailed Description of First Aspect Embodiments

As indicated above, the first aspect includes embodiments in which stabilization of the antimicrobials described above against ultraviolet light degradation is involved.
Ultraviolet Light Stabilizer(s)

The ultraviolet light stabilizer(s) used in the microbiocidal compositions of the first aspect embodiments is/are selected from (i) ascorbic acid, (ii) dehydroascorbic acid, (iii) an edible water-soluble salt or ester of ascorbic acid, (iv) an edible water-soluble salt or ester of dehydroascorbic acid, or (v) a mixture of any two or more of (i) through (iv). As used herein, the term "edible" denotes that the substance is non-toxic and thus can be ingested by humans and the term "water-soluble" denotes that the salt or ester can be dissolved in water in an amount sufficient to achieve at least the minimum proportions relative to component (A) as set forth hereinafter under the heading "Proportions of Components (A) and (B) Relative to Each Other." The aqueous microbiocidal compositions with which the ultraviolet light stabilizer(s) have been blended are characterized by having increased resistance against formation of bromate ion during exposure of the compositions to ultraviolet radiation.

The preferred ultraviolet light stabilizer(s) is/are ascorbic acid, especially L-ascorbic acid and its edible water-soluble salts and esters.

Non-limiting examples of suitable salts of ascorbic acid or of dehydroascorbic acid include metal salts such as sodium ascorbate, potassium ascorbate, calcium ascorbate, magnesium ascorbate, zinc ascorbate and also quaternary ammonium ascorbate salts and the corresponding salts of dehydroascorbic acid. Esters of ascorbic acid, such as L-ascorbic acid, or of dehydroascorbic acid can be formed with organic or inorganic acids. Non-limiting examples of suitable esters include L-ascorbic acid 2-0-sulfate, L-ascorbic acid 2-0-phosphate, L-ascorbic acid 3-0-phosphate, L-ascorbic acid 6-hexadecanoate, L-ascorbic acid monostyrate, L-ascorbic acid dipalmitate, and the like. Alcoholic esters of ascorbic acid may also be used such as ethyl ascorbate, propyl ascorbate, isopropyl ascorbate, glyceryl ascorbate, and analogous alcoholic esters. The ascorbic acid (Vitamin C) or compound having Vitamin C activity (e.g., dehydroascorbic acid, L-ascorbic acid, and the edible acids or esters thereof) can be utilized in combination with at least one compound selected from the group consisting of the aldono-lactones of L-threonic acid, L-xylonic acid, L-lyxonic acid, and the edible salts of L-threonic acid, L-xylonic acid, and L-lyxonic acids. See in this connection U.S. Pat. Nos. 4,822,816; 4,968,716 and 5,070,085.

For convenience, ascorbic acid in its various forms, dehydroascorbic acid and/or at least one edible water-soluble salt of ascorbic acid or dehydroascorbic acid, and/or at least one edible water-soluble ester of ascorbic acid or dehydroascorbic acid are often referred to hereinafter both in the singular and in the plural, as component (B).
Proportions of Components (A) and (B) Relative to Each Other When using a solid state bromine-based microbiocidal compound, the proportion of component (B) relative to component (A) is typically up to about one part by weight of component (B) per part by weight of bromine in component (A). When using a liquid state bromine-based microbiocidal composition, the proportions of component (B) used are typically up to about 1 part by weight of component (B) per each part by weight of active bromine content of an aqueous solution or slurry produced by introducing component (A) into water. The minimum amount of component (B) used is that amount which is sufficient to inhibit bromate formation when a solution of the product is subjected to ultraviolet radiation. Ordinarily, this minimum amount will be about 0.1 part by weight of component (B) per each part by weight of bromine in component (A) and 0.1 part by weight of component (B) per each part by weight of active halogen content in an aqueous medium containing a solution or slurry of component (A). Preferably, the solid state compositions of this invention will contain components (A) and (B) in a weight ratio in the range of about 0.25 part by weight of component (B) per each part by weight of bromine in component (A) to about 1 part by weight of component (B) per each part by weight of bromine in component (A). Similarly, the liquid state compositions of this invention preferably contain components (A) and (B) in a weight ratio in the range of about 0.25 part of component (B) per part of active halogen in the aqueous solution or slurry of component (A) to about 1 part of component (B) per part of active halogen in the aqueous solution or slurry of component (A). It will be appreciated that departures from the foregoing proportions are permissible and within the scope of this invention whenever deemed necessary or appropriate.
Blending of Components (A) and (B)

To form the compositions of this invention, components (A) and (B) or an aqueous solution or slurry formed by introducing (A) into water are brought together in the proper proportions to form the desired composition. Thus, when the components used are all solids, a blending mixer or mill can be employed to ensure that the components are intimately mixed together in powder form. If desired, the powder can then be compacted, preferably in combination with a suitable non-toxic binding agent such as micronized synthetic polyolefin-based hydrocarbon wax and/or micronized synthetic polyfluorocarbon wax or other suitable resinous or waxy material. A few examples of commercially available materials of this type include micronized polyethylene wax (MPP-611, Micro Powders Inc., Tarrytown, N.Y.); polypropylene wax (MICROPRO 400, Micro Powders Inc., Tarrytown, N.Y.); a micronized modified petroleum resin (Handy Tack 140, Micro Powders Inc., Tarrytown, N.Y.); and a fluorinated hydrocarbon mixture (Polysilk 600, Micro Powders Inc., Tarrytown, N.Y.). In this way water-soluble granules, prills, flakes, pellets, wafers, tablets, caplets, pucks, briquettes, or other forms of the combined product can be formed.

When blending together component (B) and an aqueous solution or slurry of component (A) the components are typically brought together in a suitable mixing vessel in which component (B) becomes dissolved in the aqueous medium of component (A). Additional water can be added if desired. Desirably, the finished solution should be sufficiently concentrated so that on shipment and storage for ultimate usage an excess amount of water is not included in the shipment.

Treatment of Aqueous Systems

The solid-state blends of component (A) and component (B) and the mixtures of component (B) and an aqueous solution or slurry of component (A) are well suited for addition to various aqueous systems in which biocidal action is desired. These systems include water in swimming pools, hot tubs, spas, whirlpool baths, and decorative fountains. Also, water such as industrial cooling water, cooling tower water, process water, water in air washer systems, water used in pulp and paper processing operations, water used in oil field applications, and wastewater in general can be treated with solid-state blends of components (A) or (B) or a mixture of component (B) and an aqueous solution or slurry of component (A). Alternatively, appropriate proportions of component (A) and component (B), wherein component (B) can either be in the solid-state or as an aqueous concentrated solution or slurry can be blended individually in any sequence with the water to be treated. Use of the preformed solid-state blends of components (A) and (B) or of mixtures of component (B) and an aqueous solution or slurry of component (A) is preferred as it simplifies the blending operation and reduces the opportunity for blending errors.

In all cases, a microbiocidal quantity of an antimicrobial composition of this invention is introduced into or mixed with the water to be treated. The effective microbiocidal quantity can vary from case to case, depending for example, on the particular bromine-based antimicrobial agent being used, the nature and content of microorganisms present in the aqueous medium to be treated, and the use to which the water is to be put or has been put. Generally speaking, however, a microbiocidally effective amount of an antimicrobial composition of this invention will be in the range of about 0.01 to about 400 ppm, preferably in the range of about 0.02 to about 200 ppm (wt/wt) and more preferably in the range of about 0.05 to about 100 ppm (wt/wt) of active bromine in the aqueous medium of active bromine. Amounts in the range of about 0.1 to about 50 ppm are especially preferred.

Introduction of the antimicrobial composition of this invention into the water to be treated or addition of the antimicrobial composition of this invention to the water to be treated can be effected in various ways. One common way is simple broadcasting of a solid-state combination of components (A) and (B) onto the water using a suitable device as a scoop or shovel, or pouring of liquid mixtures of component (B) and an aqueous solution or slurry of component (A) onto the water from a suitable container, the precise device used depending upon the scale of operation. Alternatively, feeding devices can be employed wherein water is caused to flow into a dispensing device containing a suitable quantity of a solid-state combination of components (A) and (B). Dispensers that periodically dispense a suitable quantity of a single phase liquid mixture or of a liquid phase containing a suspended or dispersed finely-divided particulate substance can be used to introduce a mixture of component (B) and a solution or slurry of component (A) into contact with the main body of the water to be treated. Floating devices have also been developed that dispense microbiocidal materials into the water in which the floater is located, and such devices can also be used for dispensing antimicrobial compositions of this invention.

The compositions of this invention can be used for killing, or at least controlling, mobile or imobile bacteria such as for example *Escherichia coli, Salmonella enteritidis, Salmonella typhimurim, Campylobacter jejuni, Campylobacter coli, Campylobacter lari*, and bacteria in the form of biofilms such as for example *Listeria monocytogenes, Pseudomonas fluorescens, Pseudomonas aeruginosa, Enterococcus faecium*, and *Staphylococcus aureus*. In addition to being used for treating aqueous systems, or carcasses of poultry or four-legged animals, the antimicrobial compositions of this invention can be used in diluted aqueous form for treatment of seafood and various surfaces constituting loci of various microorganisms, pathogens, or the like. Thus, the aqueous compositions formed pursuant to this invention can be used for treating equipment used in meat packing plants and in poultry processing plants, as well as hard surfaces or objects such as walls, floors, cutting tables, conveyor belts, shackles, cutting tools, and the like. For a detailed description of procedures in which the aqueous compositions formed pursuant to this invention can be utilized, reference may be had, for example, to U.S. Pat. Nos. 6,908,636 and 6,986,910.

The following examples illustrate the practice of aspect A of this invention. They are not intended to limit the invention to only that which is disclosed therein.

Example 1

To 1 kilogram of 1,3-dibromo-5,5-dimethylhydantoin powder is added with mixing under anhydrous conditions 616 grams of finely divided ascorbic acid. After thorough mixing for 10 minutes, a substantially uniform composition of this invention containing 560 grams of bromine is formed. Addition of this composition to water at a level of 50 ppm (wt/wt) provides a solution suitable for use in washing hard surfaces such as kitchen counters, sinks, and kitchen appliances.

Example 2

A concentrated aqueous solution containing 38 wt % of sodium ascorbate per liter is formed. Ten mL of this concentrated solution is mixed with 7 grams of N,N'-bromochloro-5,5-dimethylhydantion. The resultant solution is then added to 500 liters of water contaminated with *Escherichia coli* in order to sanitize that water.

Such terms as "antimicrobial compositions", "antimicrobial substances", "microbiocidal compound", "bromine-based microbiocides," and any other terms of similar import, and whether used in the singular or plural, are used interchangeably herein to signify that the composition is capable of killing microbes, bacteria, and/or pathogens or at least effectively controlling microbial, bacterial or pathological activity caused by such organisms. No hard and fast distinctions are intended among these terms as used herein. Embodiments of the first aspect of this invention include the following:

AA An antimicrobial composition stabilized against ultraviolet light degradation formed from components comprising:
(A) at least one microbiocidal component selected from the group consisting of:
I) at least one solid-state microbiocidal compound having at least one bromine atom in the molecule;
II) an aqueous solution or slurry of at least one solid-state microbiocidal compound having at least one bromine atom in the molecule;
III) a concentrated aqueous microbiocidal composition having an active bromine content of at least 50,000 ppm, which composition is formed from components comprising water and (i) bromine chloride or bromine chloride and bromine, with or without conjoint use of chlorine, and (ii) overbased alkali metal salt of sulfamic acid, and/or sulfamic acid, alkali metal base, and water, wherein the relative proportions of (i) and (ii) are such that the atom ratio of nitrogen to active bromine is greater than 0.93, and wherein the pH of the composition is greater than 7;
IV) a solid-state microbiocidal composition which is a dewatered concentrated aqueous antimicrobial composition of III); and
(B) at least one ultraviolet light-stabilizer selected from (i) ascorbic acid, (ii) dehydroascorbic acid, (iii) an edible water-soluble salt or ester of ascorbic acid,
(iv) an edible water-soluble salt or ester of dehydroascorbic acid, or (v) a mixture of any two or more of (i) through (iv).

AB An antimicrobial composition as in AA wherein said at least one component of (A) is at least one solid-state microbiocidal compound of I).

AC An antimicrobial composition as in AA wherein said at least one component of (A) is an aqueous solution or slurry of II).

AD An antimicrobial composition as in AA wherein said at least one component of (A) is a concentrated aqueous microbiocidal composition of III).

AE An antimicrobial composition as in AA wherein said at least one component of (A) is a solid-state microbiocidal composition of IV).

AF An antimicrobial composition as in AB wherein said at least one solid-state microbiocidal compound of I) is (a) at least one 1,3-dihalo-5,5-dialkylhydantoin in which both of the halo atoms are bromine atoms and one of the alkyl groups is a methyl group and the other is a $C_{1-4}$ alkyl group or (b) at least one 1,3-dihalo-5,5-dialkylhydantoin in which one of the halo atoms is a bromine atom and the other is a chlorine atom, and both alkyl groups are, independently, $C_{1-4}$ alkyl groups.

AG An antimicrobial composition as in AF wherein said at least one solid-state microbiocidal compound of I) is at least one 1,3-dihalo-5,5-dialkylhydantoin in which both of the halo atoms are bromine atoms and one of the alkyl groups is a methyl group and the other is a $C_{1-4}$ alkyl group.

AH An antimicrobial composition as in AG wherein said at least one 1,3-dihalo-5,5-dialkylhydantoin consists essentially of 1,3-dibromo-5,5-dimethylhydantoin.

AI An antimicrobial composition as in AF wherein said at least one solid-state microbiocidal compound of I) is at least one 1,3-dihalo-5,5-dialkylhydantoin in which one of the halo atoms is a bromine atom and the other is a chlorine atom, and both alkyl groups are, independently, $C_{1-4}$ alkyl groups.

AJ An antimicrobial composition as in AI wherein said at least one 1,3-dihalo-5,5-dialkylhydantoin consists essentially of N,N'-bromochloro-5,5-dimethylhydantoin.

AK An antimicrobial composition as in AC wherein said aqueous solution or slurry of II) is an aqueous solution or slurry of (a) at least one 1,3-dihalo-5,5-dialkylhydantoin in which both of the halo atoms are bromine atoms and one of the alkyl groups is a methyl group and the other is a $C_{1-4}$ alkyl group or (b) at least one 1,3-dihalo-5,5-dialkylhydantoin in which one of the halo atoms is a bromine atom and the other is a chlorine atom, and both alkyl groups are, independently, $C_{1-4}$ alkyl groups.

AL An antimicrobial composition as in AK wherein said aqueous solution or slurry of II) is an aqueous solution or slurry of at least one 1,3-dihalo-5,5-dialkylhydantoin in which both of the halo atoms are bromine atoms and one of the alkyl groups is a methyl group and the other is a $C_{1-4}$ alkyl group.

AM An antimicrobial composition as in AL wherein said at least one 1,3-dihalo-5,5-dialkylhydantoin consists essentially of 1,3-dibromo-5,5-dimethylhydantoin.

AN An antimicrobial composition as in AK wherein said aqueous solution or slurry of II) is an aqueous solution or slurry of at least one 1,3-dihalo-5,5-dialkylhydantoin in which one of the halo atoms is a bromine atom and the other is a chlorine atom, and both alkyl groups are, independently, $C_{1-4}$ alkyl groups.

AO An antimicrobial composition as in AN wherein said at least one 1,3-dihalo-5,5-dialkylhydantoin consists essentially of N,N'-bromochloro-5,5-dimethylhydantoin.

AP An antimicrobial composition as in AD wherein said concentrated aqueous microbiocidal composition of III) is formed from components comprising water having in solution therein an active bromine content derived from (i) bromine chloride or bromine chloride and bromine, without conjoint use of chlorine, of at least 100,000 ppm (wt/wt), and (ii) overbased alkali metal salt of sulfamic acid in which the alkali metal of said salt is (a) lithium, (b) sodium, (c) potassium, or (d) any two or all three of (a), (b), and (c), and/or (e) sulfamic acid, (f) at least one base of lithium, sodium, and/or potassium, and (g) water, wherein the relative proportions of (i) and (ii) are such that the atom ratio of nitrogen to active bromine is greater than 0.93, and wherein the pH of the composition is greater than 7.

AQ An antimicrobial composition as in AE wherein said solid-state microbiocidal composition of IV) is a dewatered concentrated aqueous biocide composition formed from a concentrated aqueous antimicrobial composition that was formed from components comprising water having in solution therein an active bromine content derived from (i) bromine chloride or bromine chloride and bromine without conjoint use of chlorine, of at least 100,000 ppm (wt/wt), and (ii) overbased alkali metal salt of sulfamic acid in which the alkali metal of said salt is (a) lithium, (b) sodium, (c) potassium, or (d) any two or all three of (a), (b), and (c), and/or (e) sulfamic acid, (f) at least one base of lithium, sodium, and/or potassium, and (g) water, wherein the relative proportions of (i) and (ii) are such that the atom ratio of nitrogen to active bromine is greater than 0.93, and wherein the pH of the composition is greater than 7.

AR An aqueous medium into which has been introduced a microbiocidal quantity of an antimicrobial composition as in any of AA-AQ wherein said components (A) and (B) were introduced into said aqueous medium separately and/or as a preformed composition comprising components (A) and (B).

AS An aqueous medium as in AR wherein prior to introduction into said medium, said at least one component of (A) is at least one solid-state microbiocidal compound of (A), and wherein said microbiocidal quantity is in the range of about 0.01 to about 400 ppm (wt/wt) of active bromine AT An aqueous medium as in AS wherein said microbiocidal quantity is in the range of about 0.02 to about 200 ppm (wt/wt) or less of active bromine.

AU An aqueous medium as in AS wherein said microbiocidal quantity is in the range of about 0.05 to about 100 ppm (wt/wt).

AV An aqueous medium as in AS wherein said at least one solid-state microbiocidal compound of (A) is at least one 1,3-dihalo-5,5-dialkylhydantoin in which both of the halo atoms are bromine atoms and one of the alkyl groups is a methyl group and the other is a $C_{1-4}$ alkyl group.

AW An aqueous medium as in AV wherein said at least one 1,3-dihalo-5,5-dialkylhydantoin consists essentially of 1,3-dibromo-5,5-dimethylhydantoin.

AX An aqueous medium as in AS wherein said at least one solid-state microbiocidal compound of (A) is at least one 1,3-dihalo-5,5-dialkylhydantoin in which one of the halo atoms is a bromine atom and the other is a chlorine atom, and both alkyl groups are, independently, $C_{1-4}$ alkyl groups.

AY An aqueous medium as in AX wherein said at least one 1,3-dihalo-5,5-dialkylhydantoin consists essentially of N,N'-bromochloro-5,5-dimethylhydantoin.

AZ An aqueous medium as in AX wherein said microbiocidal quantity is in the range of about 0.02 to about 200 ppm (wt/wt) or less of active bromine.

BA An aqueous medium as in AX wherein said microbiocidal quantity is in the range of about 0.05 to about 100 ppm (wt/wt).

BB An aqueous medium as in AR wherein prior to introduction into said medium, component (A) is (1) a concentrated aqueous microbiocidal composition of III) formed from components comprising an aqueous biocide composition comprising water having in solution therein an active bromine content derived from (i) bromine chloride or bromine chloride and bromine, with or without conjoint use of chlorine, of at least 50,000 ppm (wt/wt), and (ii) overbased alkali metal salt of sulfamic acid and/or sulfamic acid, alkali metal base, and water, wherein the relative proportions of (i) and (ii) are such that the atom ratio of nitrogen to active bromine is greater than 0.93, and wherein the pH of the composition is greater than 7; or (2) a solid-state microbiocidal composition which is a dewatered concentrated aqueous biocide composition of (1), and wherein said microbiocidal quantity is in the range of about 0.01 to about 400 ppm (wt/wt) of active bromine.

BC An aqueous medium as in BB wherein component (A) is (1) and (1) is formed without conjoint use of chlorine, wherein said active bromine content is at least 100,000 ppm, and wherein the alkali metal of said overbased alkali metal salt of sulfamic acid and/or of said alkali metal base is (a) lithium, (b) sodium, (c) potassium, or (d) any two or all three of (a), (b), and (c).

BD An aqueous medium as in BB wherein component (A) is (2).

BE An aqueous medium as in BD wherein and component (A) is (2), and (1) as used in forming (2) was formed without conjoint use of chlorine, wherein said active bromine content is at least 100,000 ppm, and wherein the alkali metal of said overbased alkali metal salt of sulfamic acid and/or of said alkali metal base is (a) lithium, (b) sodium, (c) potassium, or (d) any two or all three of (a), (b), and (c).

BF An aqueous medium as in BB wherein said microbiocidal quantity is in the range of about 0.02 to about 200 ppm (wt/wt) of active bromine BG A method of controlling microbes, which method comprises applying to the locus of the microbes an aqueous medium containing an antimicrobial quantity of active bromine formed from inclusion in said aqueous medium of an antimicrobial composition of AA.

BH A method as in BJ wherein said at least one component (A) of said antimicrobial composition is at least one solid-state microbiocidal compound of I).

BI A method as in BH wherein said microbiocidal compound of I) comprises 1,3-dibromo-5,5-dimethylhydantoin.

BJ A method as in BH wherein said microbiocidal compound of I) comprises N, N'-bromochloro-5,5-dimethylhydantoin.

BK A method of stabilizing at least one microbiocidal composition against ultraviolet light degradation wherein said microbiocidal composition comprises at least one microbiocidal component selected from the group consisting of:
  I) at least one solid-state microbiocidal compound having at least one bromine atom in the molecule;
  II) an aqueous solution or slurry of at least one solid-state microbiocidal compound having at least one bromine atom in the molecule;
  III) a concentrated aqueous microbiocidal composition comprising water having in solution therein an active bromine content of at least 50,000 ppm (wt/wt) derived from (a) bromine chloride or bromine chloride and bromine, with or without conjoint use of chlorine, and (b) overbased alkali metal salt of sulfamic acid and/or sulfamic acid, alkali metal base, and water, wherein the relative proportions of (a) and (b) are such that the atom ratio of nitrogen to active bromine is greater than 0.93, and wherein the pH of the composition is greater than 7; and
  IV) a solid-state microbiocidal composition which is a dewatered concentrated aqueous antimicrobial composition of III);

which method comprises mixing with or adding to said selected component an ultraviolet light degradation-inhibiting amount of up to one part by weight of at least one ultraviolet light-stabilizer selected from (i) ascorbic acid, (ii) dehydroascorbic acid, (iii) an edible water-soluble salt or ester of ascorbic acid, (iv) an edible water-soluble salt or ester of dehydroascorbic acid, or (v) a mixture of any two or more of (i) through (iv) per part by weight of bromine in said selected component I) or IV) or of active bromine in said selected component II) or III).

BL A method as in BK wherein the component selected is I) or II).

BM A method as in BK wherein the component selected is I) and is (a) at least one 1,3-dihalo-5,5-dialkylhydantoin in which both of the halo atoms are bromine atoms and one of the alkyl groups is a methyl group and the other is a $C_{1-4}$ alkyl group, or a water solution or slurry formed therefrom or (b) at least one 1,3-dihalo-5,5-dialkylhydantoin in which one of the halo atoms is a bromine atom and the other is a chlorine atom, and both alkyl groups are, independently, $C_{1-4}$ alkyl groups, or a water solution or slurry formed therefrom.

BN A method as in BK wherein the component selected is II) and is an aqueous solution or slurry of (a) at least one 1,3-dihalo-5,5-dialkylhydantoin in which both of the halo atoms are bromine atoms and one of the alkyl groups is a methyl group and the other is a $C_{1-4}$ alkyl group, or (b) at least one 1,3-dihalo-5,5-dialkylhydantoin in which one of the halo atoms is a bromine atom and the other is a chlorine atom, and both alkyl groups are, independently, $C_{1-4}$ alkyl groups.

BO A method of controlling microbial contamination of carcasses of poultry or four-legged animals in the processing of poultry or four-legged animals as food products, which method comprises contacting said carcasses with an aqueous medium containing an effective microbial inhibiting amount of active bromine resulting from the addition to said medium of a stabilized antimicrobial composition formed from components comprising:

(A) at least one microbiocidal component selected from the group consisting of:
I) at least one solid-state microbiocidal compound having at least one bromine atom in the molecule;
II) an aqueous solution or slurry of at least one solid-state microbiocidal compound having at least one bromine atom in the molecule;
III) a concentrated aqueous antimicrobial composition formed from components comprising an aqueous microbiocide composition comprising water having in solution therein an active bromine content derived from (i) bromine chloride or bromine chloride and bromine, with or without conjoint use of chlorine, of at least 50,000 ppm (wt/wt), and (ii) overbased alkali metal salt of sulfamic acid and/or sulfamic acid, alkali metal base, and water, wherein the relative proportions of (i) and (ii) are such that the atom ratio of nitrogen to active bromine is greater than 0.93, and wherein the pH of the composition is greater than 7;
IV) a solid-state microbiocidal composition which is a dewatered concentrated aqueous antimicrobial composition of III); and (B) up to about one part by weight of at least one ultraviolet light-stabilizer selected from (i) ascorbic acid, (ii) dehydroascorbic acid, (iii) an edible water-soluble salt or ester of ascorbic acid, (iv) an edible water-soluble salt or ester of dehydroascorbic acid, or (v) a mixture of any two or more of (i) through (iv) per part by weight of bromine in said at least one solid-state microbiocidal compound of I) or in said solid-state microbiocidal composition of IV), or per part by weight of active bromine in said aqueous solution or slurry of II), or in said concentrated aqueous microbiocidal composition of III).

Further Detailed Description of Second Aspect Embodiments

As indicated above, the second aspect involves a new way of controlling bacterial, yeast, and/or mold contamination of seafood and seafood products at any of a variety of points in the manufacture, distribution, or dispensing of seafood and seafood products.

Concentrations of Bromine-Based Microbiocides Used

To form the aqueous microbiocidal composition applied to the seafood or seafood product in order to control bacterial, yeast, and/or mold contamination, thereon or therein, a microbiocidally effective amount of at least one particular component is selected from at least one of the Groups designated as Groups I), II), III), and IV) and is dissolved in water. The microbiocidally effective amount can vary depending upon various factors such as the identity of the particular component that is selected from Groups I), II), III), and IV), the amount and type of pathogen to be controlled, and the characteristics of the particular seafood or seafood product. Generally speaking, however, a microbiocidally effective amount of an antimicrobial composition of Groups I), II), III), and/or IV) will be that which, upon addition to water, provides in the range of about 0.01 to about 200 ppm (wt/wt), preferably in the range of about 0.05 to about 100 ppm (wt/wt), and more preferably in the range of about 0.05 to about 50 ppm (wt/wt) of active bromine in the resultant aqueous solution.

In preferred embodiments of this invention, the aqueous microbiocidal composition applied to the seafood or seafood product is an aqueous microbiocidal composition that is stabilized against ultraviolet light-induced degradation by inclusion in the composition of at least one ultraviolet light stabilizer.

Proportions of Ultraviolet Light Stabilizer(s) Used

In order to provide stabilization against ultraviolet light-induced degradation or decomposition, the ultraviolet light stabilizer(s) is/are employed in an ultraviolet light-degradation inhibiting amount of up to about 1 part by weight of ultraviolet light stabilizer(s) per part by weight of bromine in the selected microbiocidal component with which it is associated. Thus, when using at least one solid state microbiocidal compound of Group I), (e.g., 1,3-dibromo-5,5-dimethylhydantoin or N,N'-bromochloro-5,5-dimethylhydantoin) or at least one solid-state microbiocidal composition of Group IV), e.g., a dewatered concentrated aqueous biocide composition formed by removing the water from Stabrom® 909 biocide (Albemarle Corporation), the proportion of the ultraviolet light stabilizer(s) is based on the weight of bromine in the solid-state microbiocidal compound or composition. When using a liquid component from among the particular components of Group II) or Group III), e.g., an aqueous solution or slurry of a solid-state microbiocidal compound having at least one bromine atom in the molecule of Group II), such as an aqueous solution of 1,3-dibromo-5,5-dimethylhydantoin or of N,N'-bromochloro-5,5-dimethylhydantoin, or a liquid Group III) concentrated aqueous microbiocidal composition such as Stabrom® 909 biocide (Albemarle Corporation) or Stabrex™ biocide (Nalco Chemical Company), the proportion of the ultraviolet light stabilizer(s) is based on the weight of active bromine in the liquid Group II) or Group III) composition. Consequently, the aqueous microbiocidal composition applied to the seafood or seafood product contains a microbiocidally-effective amount of at least one aqueous antimicrobial composition selected from the individual members of Groups I), II), III), and/or IV) and an ultraviolet light degradation-inhibiting amount of up to about one part by weight of ultraviolet light stabilizer(s) per part by weight of active bromine in the selected microbiocidal composition.

Preferably, the solid-state components used in forming the ultraviolet light-stabilized aqueous microbiocidal compositions that are applied to the seafood or seafood products are made from at least one particular component selected from at least one of the groups of A) and at least one of the ultraviolet light stabilizers of B) in a weight ratio in the range of about 0.25 part by weight of component B) per each part by weight of bromine in component A) to about 1 part by weight of component B) per each part by weight of bromine in component A). Preferably, the liquid-state components used in forming the ultraviolet light-stabilized aqueous microbiocidal compositions that are applied to the seafood or seafood products are formed from components A) and B) in a weight ratio in the range of about 0.25 part by weight of component B) per each part by weight of active bromine in component A) to about 1 part by weight of component B) per each part by weight of active bromine in component A).

To form the ultraviolet light-stabilized aqueous microbiocidal composition which is applied to the seafood or seafood products, a solid-state preformed mixture of components A) and B) can be added to or mixed with water or the solid forms of components A) and B) can be added to or mixed with water as separate ingredients in solid form. Use of the preformed solid-state blends of components A) and B) is preferred as it simplifies the blending operation and reduces the opportunity for blending errors. The preformed aqueous concentrated solutions or slurries of components A) and B) are typically diluted in at least one step with sufficient water to form an ultraviolet light-stabilized microbiocidal aqueous composition which is applied to the seafood or seafood products. However, other methods can be used when making up an ultraviolet light-stabilized microbiocidal composition for such use. For example, both a preformed aqueous concentrated solution or slurry of components A) and B) and more water can be added to an initial quantity of water or liquid-state mixture of particular liquid-state component selected from Groups II) and/or III) of A) and both a preformed aqueous concentrated solution or slurry of components A) and B) and a solid-state microbiocidal compound or composition from A) can be added to the water.

Applying Aqueous Solutions to Seafood or Seafood Product

Various methods can be used for applying to seafood or a seafood product an aqueous solution containing a microbiocidally-effective amount of an aqueous antimicrobial composition used pursuant to this invention. For example, the seafood or seafood product can be immersed in a tank containing such aqueous solution, or the seafood or seafood product can be subjected to one or more sprays or mists of such aqueous solution. Depending upon the size of the facility in which the seafood or seafood product is being treated, the spray or mist can be applied by use of hand-held sprays or misting devices. Alternatively, the sprays or mists can be applied from nozzles or misting devices disposed within spray or misting cabinets or zones into or through which the seafood or seafood product is conveyed as on a conveyor belt or other automated conveyor system.

As noted above, after application of the aqueous microbiocidal solution to the seafood or seafood product, the seafood or seafood product is then washed with water in order to thoroughly wash away the microbiocidal composition from the seafood or seafood product. The time period between the application of the aqueous microbiocidal solution and the commencement of the water washing can vary, depending upon such factors as the identity of the microbiocide used in forming the aqueous microbiocidal solution, the concentration of the aqueous microbiocide in the aqueous microbiocidal solution used, and the nature and content of microbes, bacteria, fungus, yeast, mold, or other pathogens present or likely to be present on the seafood or seafood product. Generally speaking, however, the aqueous microbiocidal solution should remain in contact with the seafood or seafood product for a period in the range of about 10 seconds to about 30 minutes, and preferably in the range of about 30 seconds to about 5 minutes. Promptly thereafter the thorough water washing should be initiated. If desired, a suitable non-toxic surface active agent (surfactant, detergent, etc.) can be used in the washing operations to enhance the cleansing activity of the water wash. After using a surface active agent in water as a washing medium, the seafood or seafood product should be thoroughly washed with pure water.

Seafood and Seafood Products

As pointed out at the outset, "seafood" denotes fish harvested from fresh water, brackish water, or salt water, and thus includes fish, shellfish, crustaceans, etc. that are harvested or caught from oceans, seas, bays, lakes, rivers, streams, ponds, marshy areas, and the like. The seafood may be treated pursuant to this invention when freshly caught or after being processed such as by descaling, gutting, shucking, cleaning, filleting, or otherwise cutting the seafood so as to recover the edible portions. Operations of this type are often conducted by hand or by machines adapted for effecting such an operation. The seafood can be treated after conversion into a seafood product such as raw (uncooked) fish fillets or patties, lobster claws and tails, crayfish (crawfish) tails, eel, scallops, sashimi (including uncooked tuna, octopus, squid, shrimp, etc.) and lump crab meat. The seafood includes many forms or species of fish, such as for example, salmon, cod, halibut, tilapia, catfish, whitefish, trout, redfish, red snapper, grouper, flounder, swordfish, drum, mahi mahi, dolphin, tuna fish, herring, anchovy, eel, and many others. The seafood or seafood products can be processed pursuant to this invention in any location in which fish are caught, processed, transported, stored, or sold. Non-limiting examples of such locations include ships or vessels in which fish are caught and/or processed, in canning factories, in wholesale fish markets, in retail fish markets, in fish drying or dehydration facilities and in wholesale or retail kitchens.

Embodiments of the Second Aspect of this Invention Include the Following:

BP A method of controlling bacterial, yeast, and/or mold contamination of seafood or seafood products, which method comprises applying to the seafood or seafood product an aqueous microbiocidal composition formed from components comprising water and at least one microbiocidal component that is selected from:
  I) at least one solid-state microbiocidal compound having at least one bromine atom in the molecule;
  II) an aqueous solution or slurry of at least one solid-state microbiocidal compound having at least one bromine atom in the molecule;
  III) a concentrated aqueous microbiocidal composition having an active bromine content of at least 50,000 ppm, which composition is formed from components comprising water and (i) bromine chloride or bromine chloride and bromine, with or without conjoint use of chlorine and (ii) overbased alkali metal salt of sulfamic acid and/or sulfamic acid, alkali metal base, and water, wherein the relative proportions of (i) and (ii) are such that the atom ratio of nitrogen to active bromine is greater than 0.93, and wherein the pH of the composition is greater than 7;
  IV) a solid-state microbiocidal composition which is a dewatered concentrated aqueous antimicrobial composition of III).

BQ A method as in BP wherein said component is at least one solid-state microbiocidal compound of I).

BR A method as in BP wherein said component is an aqueous solution or slurry of II).

BS A method as in BP wherein said component is a concentrated aqueous microbiocidal composition of III).

BT A method as in BP wherein said component is a solid-state microbiocidal composition of IV).

BU A method as in BQ wherein said solid-state microbiocidal compound of I) is (a) at least one 1,3-dihalo-5,5-dialkylhydantoin in which both of the halo atoms are bromine atoms and one of the alkyl groups is a methyl group and the other is a $C_{1-4}$ alkyl group or (b) at least one 1,3-dihalo-5,5-dialkylhydantoin in which one of the halo atoms is a bromine atom and the other is a chlorine atom, and both alkyl groups are, independently, $C_{1-4}$ alkyl groups.

BV A method as in BQ wherein said solid-state microbiocidal compound of I) is at least one 1,3-dihalo-5,5-dialkylhydantoin in which both of the halo atoms are bromine atoms and one of the alkyl groups is a methyl group and the other is a $C_{1-4}$ alkyl group.

BW A method as in BV wherein said at least one 1,3-dihalo-5,5-dialkylhydantoin consists essentially of 1,3-dibromo-5,5-dimethylhydantoin.

BX A method as in BQ wherein said solid-state microbiocidal compound of I) is at least one 1,3-dihalo-5,5-dialkylhydantoin in which one of the halo atoms is a bromine atom and the other is a chlorine atom, and both alkyl groups are, independently, $C_{1-4}$ alkyl groups.

BY A method as in BX wherein said at least one 1,3-dihalo-5,5-dialkylhydantoin consists essentially of N,N'-bromochloro-5,5-dimethylhydantoin.

BZ A method as in BR wherein said aqueous solution or slurry of II) is (a) at least one 1,3-dihalo-5,5-dialkylhydantoin in which both of the halo atoms are bromine atoms and one of the alkyl groups is a methyl group and the other is a $C_{1-4}$ alkyl group or (b) at least one 1,3-dihalo-5,5-dialkylhydantoin in which one of the halo atoms is a bromine atom and the other is a chlorine atom, and both alkyl groups are, independently, $C_{1-4}$ alkyl groups.

CA A method as in BZ wherein said aqueous solution or slurry of II) is an aqueous solution or slurry of at least one 1,3-dihalo-5,5-dialkylhydantoin in which both of the halo atoms are bromine atoms and one of the alkyl groups is a methyl group and the other is a $C_{1-4}$ alkyl group.

CB A method as in CA wherein said at least one 1,3-dihalo-5,5-dialkylhydantoin consists essentially of 1,3-dibromo-5,5-dimethylhydantoin.

CC A method as in BZ wherein said aqueous solution or slurry of II) is at least one 1,3-dihalo-5,5-dialkylhydantoin in which one of the halo atoms is a bromine atom and the other is a chlorine atom, and both alkyl groups are, independently, $C_{1-4}$ alkyl groups.

CD A method as in CC wherein said at least one 1,3-dihalo-5,5-dialkylhydantoin consists essentially of N,N'-bromochloro-5,5-dimethylhydantoin.

CE A method of controlling bacterial, yeast, and/or mold contamination of seafood or seafood products, which method comprises applying to the seafood or seafood product an aqueous microbiocidal composition stabilized against ultraviolet light-induced degradation formed from components comprising water and:
A) at least one microbiocidal component that is selected from:
I) at least one solid-state microbiocidal compound having at least one bromine atom in the molecule;
II) an aqueous solution or slurry of at least one solid-state microbiocidal compound having at least one bromine atom in the molecule;
III) a concentrated aqueous microbiocidal composition having an active bromine content of at least 50,000 ppm, which composition is formed from components comprising water and (i) bromine chloride or bromine chloride and bromine, with or without conjoint use of chlorine and (ii) overbased alkali metal salt of sulfamic acid and/or sulfamic acid, alkali metal base, and water, wherein the relative proportions of (i) and (ii) are such that the atom ratio of nitrogen to active bromine is greater than 0.93, and wherein the pH of the composition is greater than 7;
IV) a solid-state microbiocidal composition which is a dewatered concentrated aqueous antimicrobial composition of III); and
B) at least one ultraviolet light stabilizer selected from (i) ascorbic acid, (ii) dehydroascorbic acid, (iii) an edible water-soluble salt or ester of ascorbic acid, (iv) an edible water-soluble salt or ester of dehydroascorbic acid, or (v) a mixture of any two or more of (i) through (iv).

CF A method as in CE wherein said component is at least one solid-state microbiocidal compound of I).

CG A method as in CE wherein said component is an aqueous solution or slurry of II).

CH A method as in CE wherein said component is a concentrated aqueous microbiocidal composition of III).

CI A method as in CE wherein said component is a solid-state microbiocidal composition of IV).

CJ A method as in CF wherein said solid-state microbiocidal compound of I) is (a) at least one 1,3-dihalo-5,5-dialkylhydantoin in which both of the halo atoms are bromine atoms and one of the alkyl groups is a methyl group and the other is a $C_{1-4}$ alkyl group or (b) at least one 1,3-dihalo-5,5-dialkylhydantoin in which one of the halo atoms is a bromine atom and the other is a chlorine atom, and both alkyl groups are, independently, $C_{1-4}$ alkyl groups.

CK A method as in CJ wherein said solid-state microbiocidal compound of I) is at least one 1,3-dihalo-5,5-dialkylhydantoin in which both of the halo atoms are bromine atoms and one of the alkyl groups is a methyl group and the other is a $C_{1-4}$ alkyl group.

CL A method as in CK wherein said at least one 1,3-dihalo-5,5-dialkylhydantoin consists essentially of 1,3-dibromo-5,5-dimethylhydantoin.

CM A method as in CJ wherein said solid-state microbiocidal compound of I) is at least one 1,3-dihalo-5,5-dialkylhydantoin in which one of the halo atoms is a bromine atom and the other is a chlorine atom, and both alkyl groups are, independently, $C_{1-4}$ alkyl groups.

CN A method as in CM wherein said at least one 1,3-dihalo-5,5-dialkylhydantoin consists essentially of N,N'-bromochloro-5,5-dimethylhydantoin.

CO A method as in CG wherein said aqueous solution or slurry of II) is an aqueous solution or slurry of (a) at least one 1,3-dihalo-5,5-dialkylhydantoin in which both of the halo atoms are bromine atoms and one of the alkyl groups is a methyl group and the other is a $C_{1-4}$ alkyl group or (b) at least one 1,3-dihalo-5,5-dialkylhydantoin in which one of the halo atoms is a bromine atom and the other is a chlorine atom, and both alkyl groups are, independently, $C_{1-4}$ alkyl groups.

CP A method as in CO wherein said aqueous solution or slurry of II) is an aqueous solution or slurry of at least one 1,3-dihalo-5,5-dialkylhydantoin in which both of the halo atoms are bromine atoms and one of the alkyl groups is a methyl group and the other is a $C_{1-4}$ alkyl group.

CQ A method as in CP wherein said at least one 1,3-dihalo-5,5-dialkylhydantoin consists essentially of 1,3-dibromo-5,5-dimethylhydantoin.

CR A method as in CO wherein said aqueous solution or slurry of II) is at least one 1,3-dihalo-5,5-dialkylhydantoin in which one of the halo atoms is a bromine atom and the other is a chlorine atom, and both alkyl groups are, independently, $C_{1-4}$ alkyl groups.

CS A method as in CR wherein said at least one 1,3-dihalo-5,5-dialkylhydantoin consists essentially of N,N'-bromochloro-5,5-dimethylhydantoin.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

Except as may be expressly otherwise indicated, the article "a" or "an" if and as used herein is not intended to limit, and should not be construed as limiting, a claim to a single element to which the article refers. Rather, the article "a" or "an" if and as used herein is intended to cover one or more such elements, unless the text expressly indicates otherwise.

This invention is susceptible to considerable variation in its practice. Therefore the foregoing description is not intended to limit, and should not be construed as limiting, the invention to the particular exemplifications presented hereinabove.

The invention claimed is:

1. A method of controlling bacterial, yeast, and/or mold contamination of seafood or seafood products, which method comprises applying to the seafood or seafood product an aqueous microbiocidal composition formed from components comprising water and at least one microbiocidal component that is selected from:
   I) at least one solid-state microbiocidal compound having at least one bromine atom in the molecule;
   II) an aqueous solution or slurry of at least one solid-state microbiocidal compound having at least one bromine atom in the molecule;
   III) a concentrated aqueous microbiocidal composition having an active bromine content of at least 50,000 ppm, which composition is formed from components comprising water and (i) bromine chloride or bromine chloride and bromine, with or without conjoint use of chlorine and (ii) overbased alkali metal salt of sulfamic acid and/or sulfamic acid, alkali metal base, and water, wherein the relative proportions of (i) and (ii) are such that the atom ratio of nitrogen to active bromine is greater than 0.93, and wherein the pH of the composition is greater than 7;
   IV) a solid-state microbiocidal composition which is a dewatered concentrated aqueous antimicrobial composition of III) wherein
   the aqueous microbiocidal composition, upon addition to water, provides in the range of about 0.01 to about 200 ppm (wt/wt) active bromine; and
wherein the contact time for the aqueous microbiocidal composition and the seafood or seafood product is in the range of about 10 seconds to about 30 minutes.

2. A method as in claim 1 wherein said at least one microbiocidal component is selected from I) and II) and is:
   1) (a) at least one 1,3-dihalo-5,5-dialkylhydantoin in which both of the halo atoms are bromine atoms and one of the alkyl groups is a methyl group and the other is a $C_{1-4}$ alkyl group or (b) at least one 1,3-dihalo-5,5-dialkylhydantoin in which one of the halo atoms is a bromine atom and the other is a chlorine atom, and both alkyl groups are, independently, $C_{1-4}$ alkyl groups; or
   2) an aqueous solution or slurry of 1).

3. A method as in claim 2 wherein said at least one 1,3-dihalo-5,5-dialkylhydantoin consists essentially of 1,3-dibromo-5,5-dimethylhydantoin.

4. A method as in claim 1 wherein said at least one microbiocidal component is a concentrated aqueous microbiocidal composition of III).

5. A method as in claim 4 wherein the active bromine content in III) is at least 100,000 ppm (wt/wt).

6. A method as in claim 1 wherein said at least one microbiocidal component is a solid-state microbiocidal composition of IV).

7. A method as in claim 1 wherein said seafood is freshly caught.

8. A method as in claim 1 wherein said seafood or seafood product has been processed by descaling, gutting, shucking, cleaning, and/or filleting.

* * * * *